(12) United States Patent
Lam et al.

(10) Patent No.: US 8,762,787 B2
(45) Date of Patent: *Jun. 24, 2014

(54) FACILITATING LARGE-SCALE TESTING USING VIRTUALIZATION TECHNOLOGY IN A MULTI-TENANT DATABASE ENVIRONMENT

(71) Applicant: salesforce.com, inc., San Francisco, CA (US)

(72) Inventors: William Lam, Foster City, CA (US); Matthew Cowger, Seattle, WA (US); Ashit Jain, San Jose, CA (US); Hung Le, Palo Alto, CA (US); Mohit Chawla, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,849

(22) Filed: Jun. 19, 2013

(65) Prior Publication Data
US 2013/0283103 A1     Oct. 24, 2013

Related U.S. Application Data

(63) Continuation of application No. 12/895,779, filed on Sep. 30, 2010, now Pat. No. 8,489,929.

(51) Int. Cl.
*G06F 11/00* (2006.01)
(52) U.S. Cl.
USPC ........................................................ 714/38.1
(58) Field of Classification Search
CPC .............. G06F 11/2289; G06F 11/36–11/3696
USPC ..................................................... 714/38.1
See application file for complete search history.

*Primary Examiner* — Bryce Bonzo
(74) *Attorney, Agent, or Firm* — Ingrassia Fisher & Lorenz, P.C.

(57) ABSTRACT

A system and method for testing in a database system. In one embodiment, a method includes receiving an indication of one or more changes to a software application, wherein each change corresponds to a different version of the software application. The method further includes generating one or more virtual machines for a version of the software application in response to the indication, wherein the one or more virtual machines test the version of the software application.

15 Claims, 5 Drawing Sheets

FACILITATING LARGE-SCALE TESTING USING VIRTUALIZATION TECHNOLOGY IN A MULTI-TENANT DATABASE ENVIRONMENT

CROSS-REFERENCE TO RELATED APPLICATION

This application is a continuation of U.S. patent application Ser. No. 12/895,779, filed Sep. 30, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to testing in a database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send information relevant to the request to the user system.

Unfortunately, defects in software that is run in a database environment may affect all users running the same version of the software. Conventional testing of software in a database environment can be inefficient, especially when the testing requires a substantial amount of resources.

BRIEF SUMMARY

Embodiments provide mechanisms and methods for testing in a database system. In one embodiment, a method includes receiving an indication of one or more changes to a software application, wherein each change corresponds to a different version of the software application. The method further includes generating one or more virtual machines for a version of the software application in response to the indication, wherein the one or more virtual machines test the version of the software application.

While one or more implementations and techniques are described, one or more embodiments may be implemented in a system having an application server providing a front end for an on-demand database service capable of supporting multiple tenants. The embodiments described herein are not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Embodiments described herein may also include embodiments that are only partially mentioned or alluded to, or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the embodiments described are not limited to the examples depicted in the figures.

DETAILED DESCRIPTION

General Overview

Systems and methods are provided for facilitating large-scale testing using virtualization technology in a multi-tenant database environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for facilitating large-scale testing using virtualization technology in a multi-tenant database environment twill be described with reference to example embodiments.

System Overview

Embodiments described herein enable, facilitate, and manage the testing of a software application in a database environment such as an on-demand database services system. Such testing may include, for example, the testing of changes to software used in a database system. Such changes are tracked using change lists. As described in more detail below, virtual machines are dynamically generated to provide pristine testing environments for each version of a given software application. Upon completion of the testing, the virtual machines are torn down to free up resources for new tests.

Figure 1:
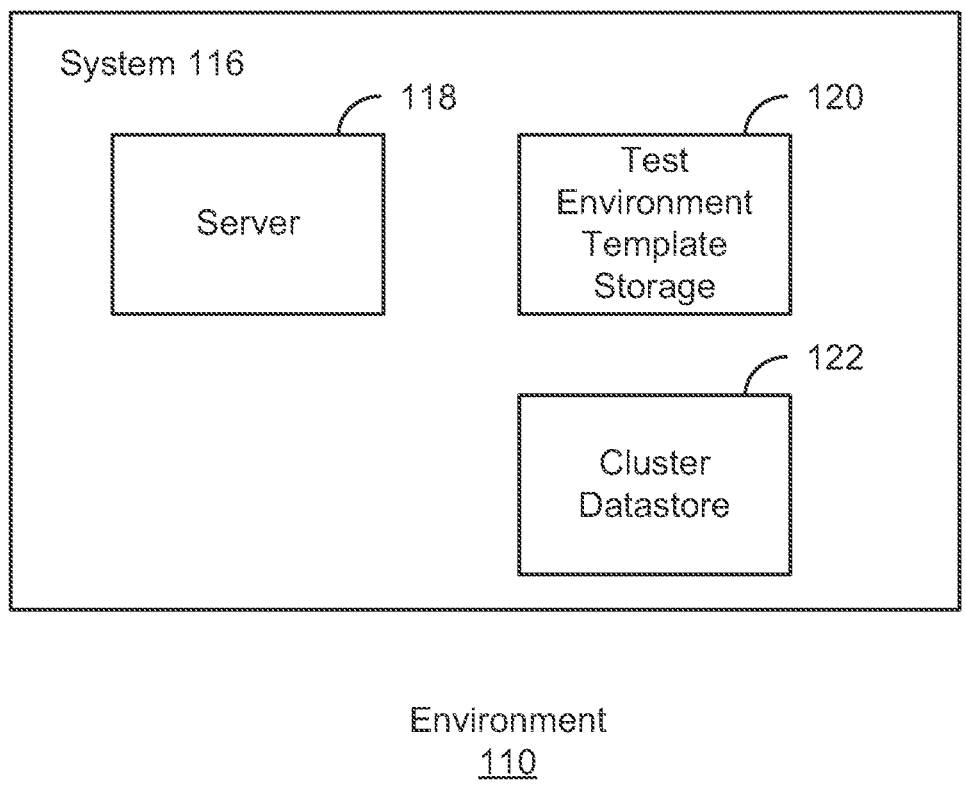
FIG. 1 illustrates a block diagram of an example environment which may be used to implement the embodiments described herein.

FIG. 1 illustrates a block diagram of an example environment 110 which may be used to implement the embodiments described herein. FIG. 1 shows a system 116, which includes a server 118, test environment template storage 120, and a cluster datastore 122. While system 116 is described as performing the steps as described in the embodiments herein, any suitable processor or processors associated with system 116 or server 118 may perform the steps described. For ease of illustration, FIG. 1 shows one block for each of server 118, test environment template storage 120, and cluster datastore 122. These blocks 118, 120, and 122 may also represent multiple servers, multiple test environment template storage units, and multiple cluster datastores. In one embodiment, the capacity of each cluster may vary (e.g., 1 terabyte or more, etc.), depending on the specific implementation.

In one embodiment, server 118 stores test environment templates for test environments in test environment template storage 120, where each test environment template may include one or more virtual machines that perform a set of functional tests. A virtual machine, as used herein, may, among other things, run test cases within the database environment as a process separate from other executing applications and instructions. In one implementation, a virtual machine is created when the testing process begins. The virtual machine may also provide the specifications used to test a particular version of software used in a database environment. In one embodiment, each test version of software may, for example, include changes to the software application.

In one embodiment, server 118 copies a test environment template from test environment template storage 120 to cluster datastore 122. Each test environment template may be a virtual machine (VM) disk, where the VM disk performs a given set of tests. As described in more detail below, multiple clones of the VM disk may be stored in datastore 122. These clones may be referred to as VM disk clones.

In one embodiment, server 118 may represent blade servers connected via double data rate (DDR) Infiniband to virtualized input-output (IO) directors, which are further connected via a fiber channel, and gigabit Ethernet to the rest of the network and storage arrays. In one embodiment, eight systems may be grouped into a distributed resource scheduler (DRS) cluster datastore. In one embodiment, each cluster datastore may be treated as a single computing resource, and each cluster datastore has its own datastore (e.g., one terabyte, etc.). In one embodiment, test environment templates may be accessed and sourced from a network storage cluster. In one embodiment, a custom-built Java servlet (e.g., AutobuildRunner) may run on any suitable clustered operating system (e.g., Linux), which provides the automated interface to the test harness. In one embodiment, communications with server 118 may be conducted using any suitable tool (e.g., a Java toolkit).

Figure 2:
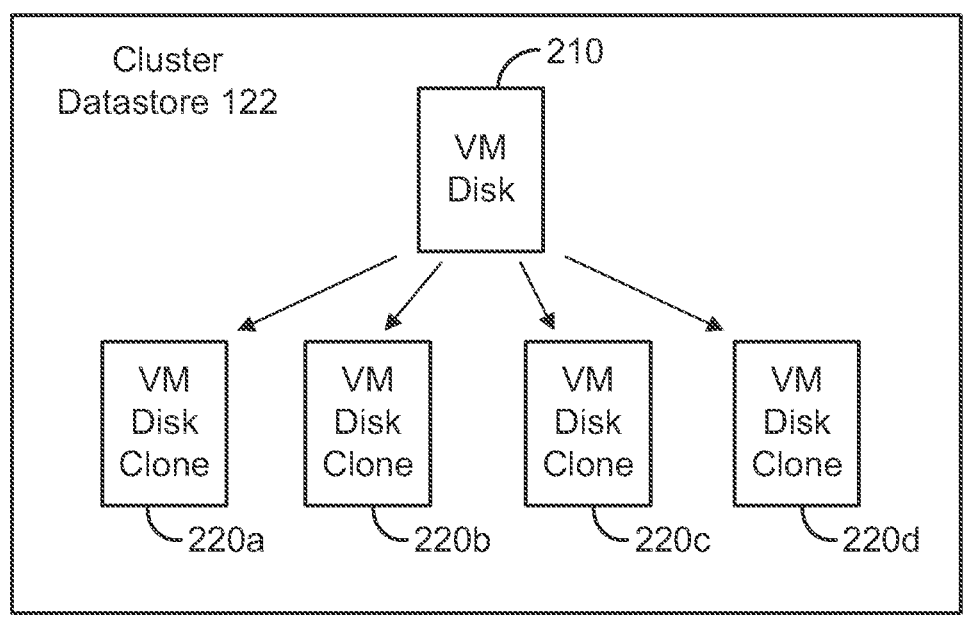
FIG. 2 illustrates a block diagram of an example cluster datastore, which may be used to implement the embodiments described herein.

FIG. 2 illustrates a block diagram of an example cluster datastore 122, which may be used to implement the embodiments described herein. In one embodiment, cluster datastore 122 stores a VM disk 210 and one or more VM disk clones 220a, 220b, 220c, 220d. VM disk 210 may also be referred to as base VM disk 210. In one embodiment, VM disk 210 stores base specifications for a test environment used to test a particular version of software used in the database environment. In one embodiment, VM disk 210 also contains all items required to boot and run an operating system in a virtual environment. In one embodiment, the VM disk 210 may employ the resources of one or more application servers and one or more database servers. As described in more detail below, VM disk clones 220 are initially empty and refer to VM disk 210 in response to certain commands. Each VM disk clone 220 is used to test a different version of the software application.

Figure 3:
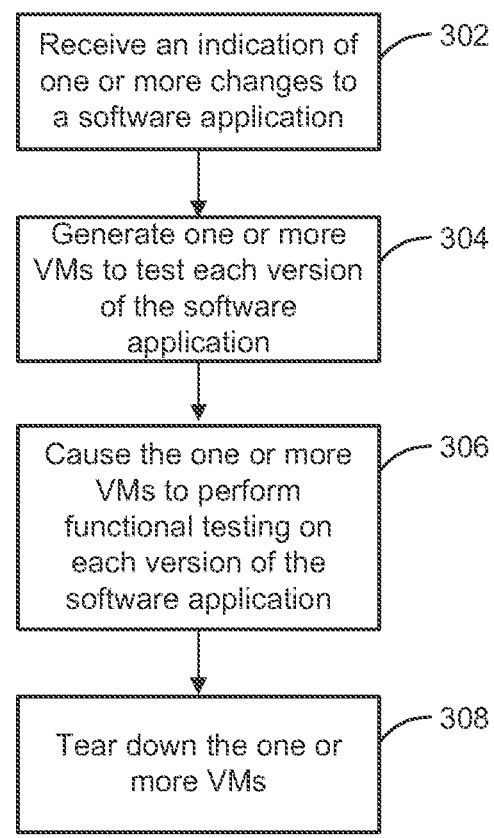
FIG. 3 illustrates an example simplified flow diagram for testing in a database system.

FIG. 3 illustrates an example simplified flow diagram for testing in a database environment. In one embodiment, the method is initiated in block 302, where system 116 receives an indication of one or more changes to a software application. In one embodiment, each change corresponds to a different version of the software application.

In one embodiment, a developer checks-in a change to the core code line of a software application. This check-in process may be referred to as a code revision check-in. In one embodiment, as long as the change does not consist solely of comments, the change will be tested. In one embodiment, a change is not eligible for use (e.g., for performance, etc.) until it has passed functional testing. In one embodiment, each new change corresponds to a new version of the software application. In one embodiment, the terms code, software code, software, and software application are used interchangeably. Also, the terms revision and version are used interchangeably. Also, the terms change and change list are used interchangeably.

In one embodiment, the testing of the software application is not performed on a local server of a developer, which could take days to perform, but is instead performed by system 116, which provides a pristine test environment configured specifically for that version of the software application. As indicated above with respect to FIG. 1, one or more test environment templates are stored in test environment template storage 120, or any other suitable storage location.

In block 304, system 116 generates one or more virtual machines to test each version of the software application. In one embodiment, the virtual machines are the VM disk clones 220. The terms virtual machine and virtual machine disk clone are used interchangeably. In one embodiment, system 116 generates VM disk clones 220 in response to the indication of one or more changes to the software application.

In one embodiment, to generate the virtual machines, system 116 retrieves a copy of a test environment template from test environment template storage 120, and stores the copy in VM disk 210 of cluster database 122 (FIGS. 1 and 2). In one embodiment, one copy of the test environment template is copied to cluster database 122. In one embodiment, if another base test environment is needed, a different test environment template may be copied to another cluster database in order to provide another set of test environments. In one embodiment, after copying the test environment template to VM disk 210, system 116 generates one or more VM disk clones 220 for each version of the software application.

In one embodiment, system 116 checks if the date stamp on each test environment template has changed within a predetermined time period (e.g., in the last 24 hours, etc.). If the date stamp has changed, system 116 copies the test environment template to cluster datastore 122 to update VM disk 210 with the new base image for the virtual machines. This ensures that all virtual machines (e.g., VM disk clones 220) have the latest database schema changes for testing the software application and that all virtual machines are built from an identical base.

In one embodiment, there may be millions of different functional tests to be performed (e.g., over 7 million different functional tests) on every version of the software application. Failures are then reported back to the developer. Accordingly, the amount of time required to test a given version may vary, depending on the actual number of tests and the number of resources made available to perform the functional tests. In one embodiment, all code changes (e.g., every iteration of code) may be required to go through the functional testing process as part of defect analysis. The functional tests ensure that each version of the software application works properly before being released.

In one embodiment, the number of VM disk clones 220 generated for each version of the software application will depend on the specific implementation. The VM disk clones 220 may be generated by any suitable clone generation tool (e.g., open source tool). For a given run of a set of functional tests (e.g., 7 million functional tests), it may take one VM disk clone 220 a certain number of days to complete the run (e.g., 1 day, 1.5 days, 2 days, etc.). Having more VM disk clones 220 available (e.g., 5, 10, 15 or more VM disk clones) will reduce the total amount of time required to run through the set of functional tests (e.g., 1 hour, 1.5 hours, 2 hours, etc.). Accordingly, if more time to test the software code is acceptable, system 116 may generate a fewer number (e.g., one or two, etc.) of VM disk clones 220. If a shorter time period for testing is desired, system 116 may generate a larger number (e.g., 70 or more, etc.).

In one embodiment, system 116 notes newly arrived change lists, and thereafter schedules the change list into a queue, and processes the queue to determine if there is capacity on cluster datastore 122 to build virtual machines (e.g., VM disk clones 220) to run the tests. In one embodiment, optimal capacity, as determined via testing, will depend on the implementation. For example, in one embodiment, there may be 50 virtual machines in an 8-node cluster. In one embodiment, if there is available capacity, the program flow for testing continues. If there is not enough capacity, the queue for initiating the functional tests sleeps for a predetermined time period (e.g., for 5 minutes) and repeats until there is capacity.

In one embodiment, system 116 may issue application programming interface (API) requests using an open source tool (e.g., VI Java Toolkit) to create new virtual machines for the functional tests. In one embodiment, in the creation of virtual machines, each new virtual machine may be created with a backing store type of VM disk clone 220 using VM disk 210. Because VM disk 210 is used as a base and is not copied, the time required for the creation is less than 10 seconds. In one embodiment, as part of an API call, a customized specification may be created so that each virtual machine will receive a unique fixed IP address on boot. Also, a power on command using the API may be issued to all new virtual machines.

In one embodiment, each VM disk clone 220 is initially empty and redirects certain commands (e.g., certain types of commands) to VM disk 210 in response to the commands. For example, in one embodiment, VM disk clones 220 may direct read commands to VM disk 210. Accordingly, all VM disk clones 220 redirect read commands to the same VM disk 210.

In one embodiment, all writes are sent to and are processed by the different VM disk clones 220. As a result, changes to the software code affect only one VM disk clone 220. Furthermore, any change to specific code of the software application is stored at the particular VM disk clone 220. Accordingly, each VM disk clone 220 provides a different test environment and tests a particular version of the software application. For ease of illustration, FIG. 2 shows four VM disk clones 220. There may be hundreds of VM disk clones 220 for testing hundreds of corresponding versions of the software application, each version having a different change.

Furthermore, additional VM disk clones 220 may be quickly and dynamically generated as needed to accommodate new versions of the software application. As such, every version of the software application gets its own separate, pristine test environment for applying the same set of functional tests (e.g., 7 million functional test, etc.).

In one embodiment, system 116 may sleep for a predetermined time period (e.g., 60 seconds) while it waits for all of the virtual machines to be customized and booted. In one embodiment, system 116 then attempts to apply a secure shell (SSH) connection to all virtual machines. If the SSH connection succeeds, system 116 moves to the next step. If the SSH connection fails, system 116 sleeps for a predetermined time period (e.g., for 60 seconds) and then repeats the SSH connection attempt.

In block 306, system 116 causes the one or more virtual machines to perform functional testing on each version of the software application. In one embodiment, once all virtual machines (e.g., VM disk clones 220) are ready, system 116 issues commands to those virtual machines, giving them the change list to download from the source management system and the subset of tests that they are required to run.

As each virtual machine runs its set of functional tests, it reports successes and failures back to system 116 (e.g., using simple object access protocol [SOAP] calls). As each virtual machine completes its final test, it performs a final SOAP call and indicates the results to system 116. Upon receipt of a completion notice from a virtual machine, system 116 collects basic performance statistics for capacity planning purposes, unregisters the virtual machine and deletes its private VM disk.

In one embodiment, the process of generating new virtual machines and testing new versions of a software application may occur hundreds of times every day (e.g., 500 times a day, etc.), performing numerous tests (e.g., over 5 billion, etc.) per day across many clusters (e.g., 20, etc.).

In block 308, system 116 tears down the one or more virtual machines after they complete the functional testing. In one embodiment, the tearing down the virtual machines frees up resources to generate new virtual machines to test new versions of the software application.

Embodiments describe herein provide numerous benefits. For example, embodiments provide pristine test environments for applying the same functional tests to each version of a software application. Embodiments quickly generate and deploy test environments for the different versions of the software application (e.g., on demand, and in seconds). Embodiments also enable test environment management efforts to be focused on test environment templates instead of individual virtual machine disks, as well as dynamically reallocating capacity across different test environments used by different branches. Furthermore, leveraging the VM disk clones saves a significant amount of time in generating virtual machines as well as shared storage disk space due to the homogeneity in the entire server farm.

Figure 4:
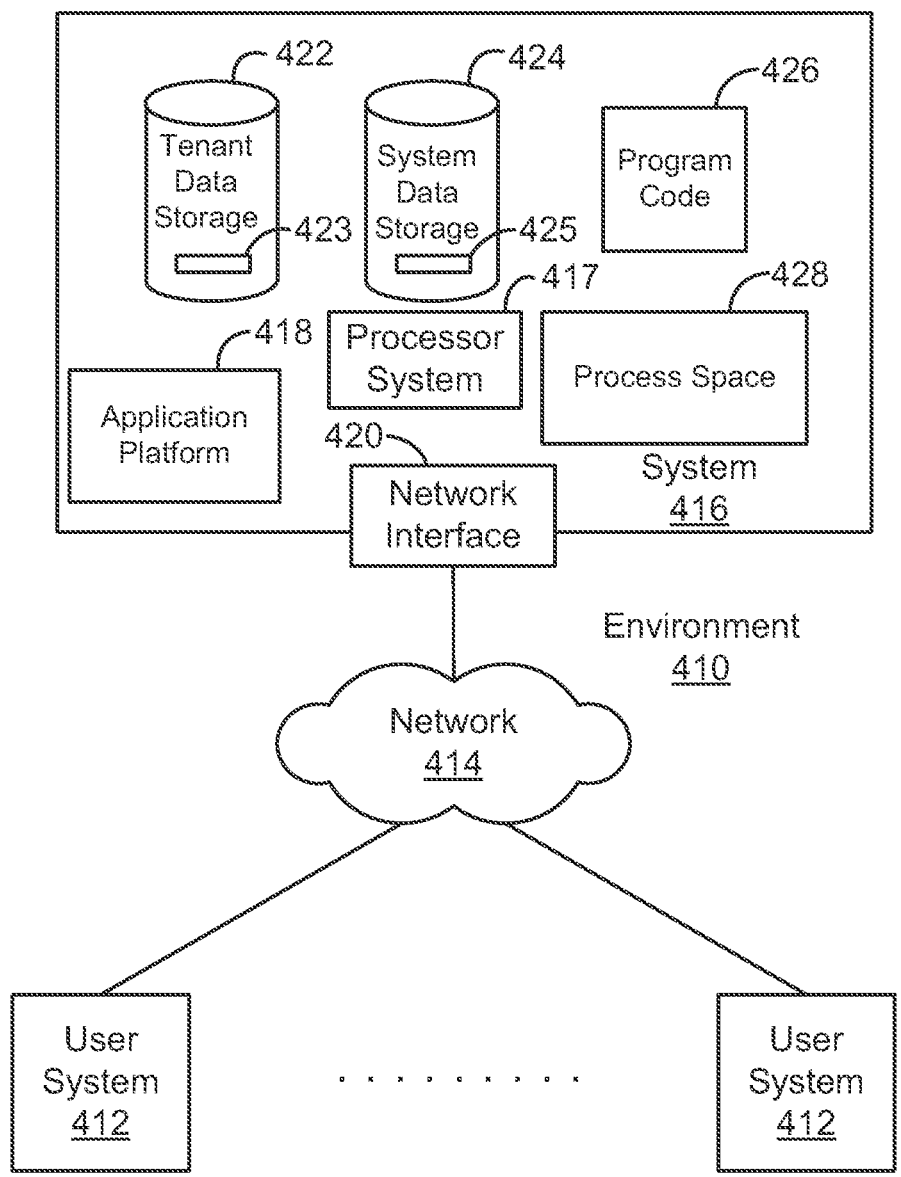
FIG. 4 illustrates a block diagram of an example environment wherein a database service might be used, and which may be used to implement the embodiments described herein.

FIG. 4 illustrates a block diagram of an example environment 410 where a database service might be used, and which may be used to implement the embodiments described herein. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416. System 416 may also be referred to as a cloud service provider. System 416 provides its resources to customers (e.g., end users) as a service.

An on-demand database service, such as system 416, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, system 416 may include an application platform 418 that enables creating, managing, and executing one or more applications developed for an on-demand database service, for users accessing the on-demand database service via user systems 412, or for third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 412 might communicate with system 416 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as to provide related data, code, forms, webpages and other information to and from user systems 412. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party application developer) software applications, which may or may not include CRM, may be supported by the application platform 418, which manages the creation and storage of the applications into one or more database objects, and executing of the applications in a virtual machine in the process space of the system 416. The terms software application and application are used interchangeably.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application (s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
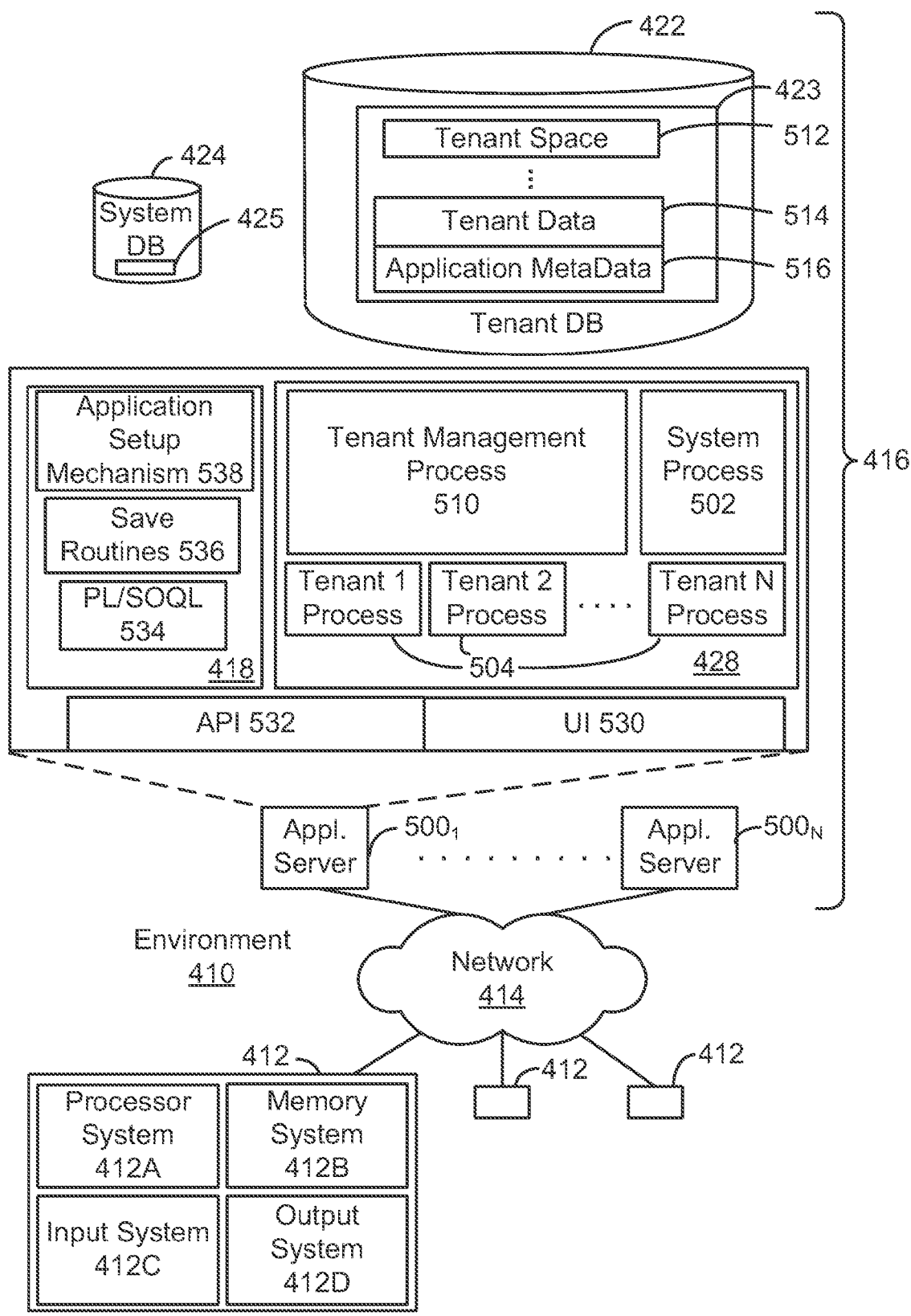
FIG. 5 illustrates a block diagram of another example environment, which may be used to implement the embodiments described herein.

FIG. 5 illustrates a block diagram of another example environment 410, which may be used to implement the embodiments described herein. While environment 410 of FIG. 5 may be used to implement the embodiments described herein, the embodiments described herein may also be applied to aspects of environment 410 of FIG. 5. For example, aspects of environment 410 of FIG. 5 may also have software code changes that may be targeted by functional tests described herein. These aspects may include, for example, elements 418, 424, 425, 500, 502, 504, 510, 516, 530, 532, 534, 536, 538, etc.

FIG. 5 also illustrates elements of system 416 and various interconnections, according to one embodiment. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, user interface (UI) 530, application program interface (API) 532, PL/Salesforce.com object query language (PL/SOQL) 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown in FIG. 4, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes and to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510, for example. Invocations to such applications may be coded using PL/SOQL 534 that provides a programming language style interface extension to API 532. Invocations to applications may be detected by one or more system processes, which manage retrieving application metadata 516 for the subscriber, making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_1$ might be coupled via a direct network link, and another application server $500_N$ might be coupled by yet a different network connection. Transfer control protocol and Internet protocol (TCP/IP) are typical protocols for communicating between application servers 500 and the database system. However, it will be apparent to one skilled in the art that other transport protocols may be used to optimize the system depending on the network connection used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles the storage of, and access to, different objects, data and applications across disparate users and organizations.

As an example of storage, one tenant might be a company that employs a sales force where each salesperson uses system 416 to manage his or her sales process. Thus, a user might maintain contact data, leads data, customer follow-up data, performance data, goals and progress data, etc., all applicable to that user's personal sales process (e.g., in tenant data storage 422). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more structured query language (SQL) statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for testing different versions of a software application in a database system, the method comprising:
   receiving an indication of one or more changes to the software application, wherein each change to the software application corresponds to a different version of the software application;
   retrieving a copy of a test environment template that comprises: a plurality of virtual machine clones that are each used to test a particular version of the software application;
   storing the test environment template in a base virtual machine;
   generating from the base virtual machine based on the test environment template, for each particular version of the software application and in response to the indication, the plurality of virtual machine clones, wherein each virtual machine clone tests a particular version of the software application; and
   sending read commands received by each of the plurality of virtual machine clones to the base virtual machine.

2. The method of claim 1, wherein:
   each particular version of the software application is tested by a different set of the plurality of virtual machines.

3. The method of claim 1, further comprising:
   tearing down each particular one of the virtual machine clones after testing the particular version of the software application corresponding to that particular virtual machine clone is complete.

4. The method of claim 1, further comprising:
   receiving, at each of the plurality of virtual machine clones, testing commands comprising: a change list to be downloaded by that particular virtual machine clone of the plurality of virtual machine clones, and a subset of tests to be run by that particular virtual machine clone of the plurality of virtual machine clones.

5. A method for testing different versions of a software application in a database system, the method comprising:
   receiving an indication of one or more changes to the software application, wherein each change to the software application corresponds to a different version of the software application;
   generating a plurality of virtual machine clones that are each used to test a particular version of the software application in response to the indication, wherein each of the virtual machine clones is used to test one of the particular versions of of the software application, and wherein the generating comprises:
      retrieving a copy of a test environment template that comprises: the plurality of virtual machine clones;
      storing the test environment template in a base virtual machine; and generating the plurality of virtual machine clones from the base virtual machine based on the test environment template; and sending read commands received by each of the plurality of virtual machine clones to the base virtual machine.

6. The method of claim 5, wherein each particular version of the software application is tested by a different set of the plurality of virtual machine clones.

7. The method of claim 5, further comprising:

tearing down each particular one of the virtual machine clones after they complete testing of the particular version of the software application corresponding to that particular virtual machine clone.

8. The method of claim 5, further comprising:

receiving, at each of the plurality of virtual machine clones, testing commands comprising: a change list to be downloaded by that particular virtual machine clone of the plurality of virtual machine clones, and a subset of tests to be run by that particular virtual machine clone of the plurality of virtual machine clones.

9. A tangible and non-transitory computer-readable storage medium carrying one or more sequences of instructions thereon for testing different versions of a software application in a database system, the instructions when executed by a processor cause the processor to:

receive an indication of one or more changes to the software application, wherein each change to the software application corresponds to a different version of the software application;

retrieve, in response to the indication, a copy of a test environment template that comprises: a plurality of virtual machine clones that are each used to test a particular version of the software application;

store the test environment template in a base virtual machine;

generate from the base virtual machine based on the test environment template, for each particular version of the software application and in response to the indication, the plurality of virtual machine clones, wherein each virtual machine clone tests a particular version of the software application;

receive, at each of the plurality of virtual machine clones, testing commands comprising: a change list to be downloaded by that particular virtual machine clone of the plurality of virtual machine clones, and a subset of tests to be run by that particular virtual machine clone of the plurality of virtual machine clones;

test each particular version of the software application with a corresponding one of the virtual machine clones; and send read commands received by each of the plurality of virtual machine clones to the base virtual machine.

10. The computer-readable storage medium of claim 9, wherein the instructions further cause the processor to:

tear down each of the virtual machine clones after that particular virtual machine clone completes testing of that particular version of the software application.

11. An apparatus for testing in a database system, the apparatus comprising:

a processor; and a storage device storing one or more stored sequences of instructions which when executed by the processor cause the processor to:

receive an indication of one or more changes to the software application, wherein each change to the software application corresponds to a different version of the software application;

retrieve, in response to receiving the indication, a copy of a test environment template that comprises: a plurality of virtual machine clones that are each used to test a particular version of the software application;

store the test environment template in a base virtual machine;

generate from the base virtual machine based on the test environment template, for each particular version of the software application and in response to the indication, the plurality of virtual machine, wherein each virtual machine clone tests a particular version of the software application;

test each particular version of the software application with a corresponding one of the virtual machine clones; and send read commands received by each of the plurality of virtual machine clones to the base virtual machine.

12. The apparatus of claim 11, wherein the instructions further cause the processor to:

tear down each of the virtual machine clones after that particular virtual machine clone completes testing of that particular version of the software application.

13. The apparatus of claim 11, wherein the instructions further cause the processor to:

receive, at each of the plurality of virtual machine clones, testing commands comprising:

a change list to be downloaded by that particular virtual machine clone of the plurality of virtual machine clones, and a subset of tests to be run by that particular virtual machine clone of the plurality of virtual machine clones.

14. The computer-readable storage medium of claim 9, wherein the instructions further cause the processor to:

receive, at each of the plurality of virtual machine clones, testing commands comprising:

a change list to be downloaded by that particular virtual machine clone of the plurality of virtual machine clones, and a subset of tests to be run by that particular virtual machine clone of the plurality of virtual machine clones.

15. A method for testing different versions of a software application in a database system, the method comprising:

receiving an indication of one or more changes to the software application, wherein each change to the software application corresponds to a different version of the software application;

retrieving a copy of a test environment template that comprises: a plurality of virtual machine clones that are each used to test a particular version of the software application;

storing the test environment template in a base virtual machine; and generating from the base virtual machine based on the test environment template, for each particular version of the software application and in response to the indication, the plurality of virtual machine clones, wherein each virtual machine clone tests a particular version of the software application.

* * * * *